Figure 1:
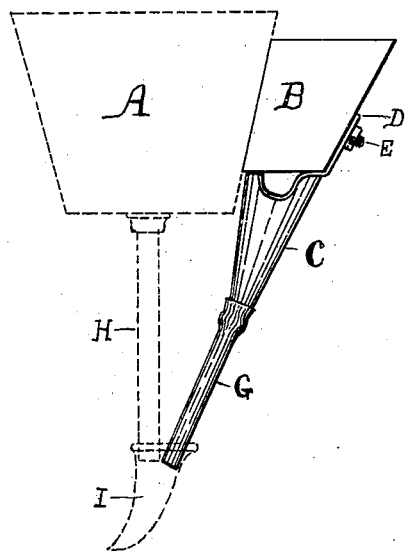

No. 705,497. Patented July 22, 1902.
H. G. WALTON.
SEEDING ATTACHMENT FOR GRAIN DRILLS.
(Application filed Mar. 31, 1902.)
(No Model.)

Witnesses,
J. C. Duvall.
R. E. Randle.

Inventor,
Herbert G. Walton;
by his attorney;
Robert W. Randle.

THE NORRIS PETERS CO., PHOTO-LITHO., WASHINGTON, D. C.

UNITED STATES PATENT OFFICE.

HERBERT G. WALTON, OF BATES COUNTY, MISSOURI.

SEEDING ATTACHMENT FOR GRAIN-DRILLS.

SPECIFICATION forming part of Letters Patent No. 705,497, dated July 22, 1902.

Application filed March 31, 1902. Serial No. 100,736. (No model.)

*To all whom it may concern:*

Be it known that I, HERBERT G. WALTON, a citizen of the United States, residing in the county of Bates, in the State of Missouri, have invented new and useful Improvements in Seeding Attachments for Grain-Drills, of which the following is a specification, which is a full, clear, and exact description of the invention, such as will enable others skilled in the art to which it appertains to make and use the same.

My invention relates to seeding attachments for grain-drills, and has for its object the provision of a device to be attached to grain-drills or the like for the purpose of facilitating the distribution of seeds for secondary crop, such as grass-seed or the like.

Another object is the provision of an auxiliary drill which can be attached to an ordinary grain-drill, for the purpose of more economically distributing grass-seed, or the like, at the same time the grain-drill is distributing grains, such as wheat, as it is a well-demonstrated fact that wheat and grass-seed cannot be properly distributed when fed from the same receptacle where they are mixed together.

Another object is the provision of a seeding-machine which will sow wheat and grass-seed at the same time, where the distribution and amount of each can be properly adjusted independent of the other or sown separately, if desired, with the same machine; and still another object is the provision of a grass-seeding attachment for grain-drills of new and novel construction, strong and durable in its parts, and which can be manufactured and sold at a comparatively low price.

Other objects and advantages will appear from the following specification and from the drawings forming a part thereof.

The invention consists in a seeding attachment for grain-drills embodying certain new and novel features and details of construction and relative disposition of parts, as otherwise hereinafter particularly set forth, illustrated in the drawings, and incorporated in the claims hereunto appended.

With the above-enumerated objects in view I will now refer to the accompanying drawings, in which—

Figure 2:
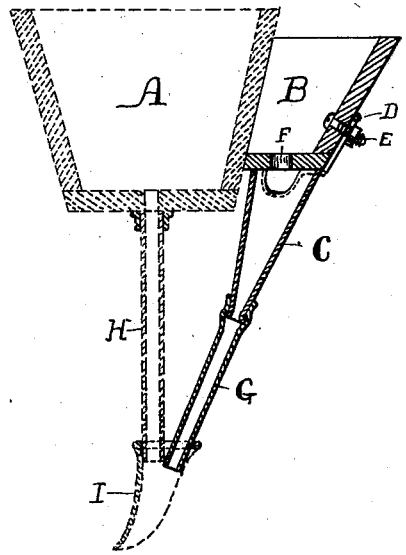
Figure 3:
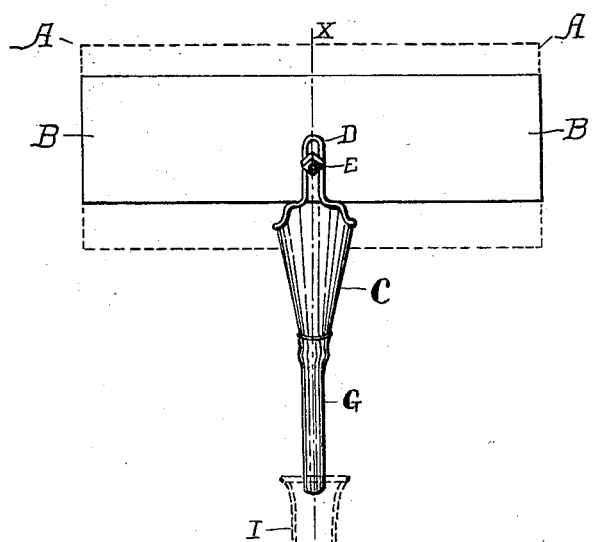

Figure 1 is an end elevation of grain-drill and of my invention connected thereto. Fig. 2 is a cross-section elevation of the same, taken on the line X X of Fig. 3; and Fig. 3 shows a rear elevation of the same parts shown in Figs. 1 and 2.

Similar letters of reference denote and refer to like parts throughout the several views.

In the drawings the parts shown in dotted lines (see Fig. 2) are old and are shown simply to illustrate the relative disposition of my invention thereto.

In the drawings, A indicates the grain-box of an ordinary grain-drill. B indicates a grass-seed box attached thereto in the rear. However, B may be attached on the front side of A, if desired. The bottom of B is supplied with a line of openings F, placed at frequent intervals along the entire length of said bottom. Said holes should be opposite similar holes in the bottom of the box A. These holes or openings are controlled by a mechanism similar to that found in the bottom of ordinary grain-drill, whereby the flow of the seed through the holes F may be controlled or entirely shut off, if desired.

C represents a spout of novel construction and are in number the same as the number of holes F in the bottom of B. The mouth of one of said spouts is secured immediately under each of the holes F in substantially the manner and position shown. The spout C should be made of metal, with a wide open mouth and tapers downward until the lower point is of a size to fit into the rubber hose G. The upper edge of C is turned to inclose a wire which extends around the upper edge of C and is inclosed thereby. The wire projects away from C at the rear of C, upward and along a portion of the rear of B, where it is formed into a loop D, the object of this being to provide a convenient means for connecting the spout C to the box B. A hole is made through the rear of B, directly opposite one of the holes F and slightly below the upper point of the loop D. Through this hole in the rear of B a bolt E is passed, so that the head or nut of the bolt will engage the sides of the loop D, and when the nut is tightened on the bolt the loop D will be tightly held to the rear of the box B.

I represents a shoe as used on an ordinary grain-drill, and H represents a spout leading from the box A to the shoe I.

In operation the spout C and tube G may be left off and the grain-drill used in the usual manner; but if it should be desired to drill grass-seed at the same time the spouts C and the tubes G are attached underneath each of the holes F in the manner described, and the lower end of the tube G may be placed in the mouth of the shoe, as shown in the drawings, or it may be left suspended in the rear, or the tube G may be entirely removed, if desired. The movement of the drill will cause the grass-seed to pass through the holes F into the spout C in the proportion desired, and the grass-seed will thus be deposited in the furrow with the wheat or deposited broadcast in the rear of I, if desired.

From the above description, taken in connection with the accompanying drawings, it is apparent that I have accomplished the objects herein referred to.

While I have illustrated and described the best means now known to me for carrying out my invention, I wish it to be understood that I do not restrict myself to the exact details of construction shown, but hold that any slight changes or variations may be made as would suggest themselves to the ordinary mechanic.

Having now fully shown and described my invention and the best mode for its construction to me known at this time, what I claim as new, and desire to secure by Letters Patent of the United States, is—

1. In a seeding attachment for grain-drills, the combination of a seedbox B secured to the grain-box of a grain-drill, a spout secured by a bolt E with the loop D in the rear of the seedbox, said spout being located underneath and opposite the holes in the bottom of the seedbox with a hose G leading downward from the lower extremity of the spout C, all substantially as shown and described.

2. In a seeding attachment for grain-drills, the combination of the following elements: the auxiliary seedbox B, secured to the grain-box A; holes F through the bottom of the seedbox; the spout C held against the under side of the bottom of B and secured to the side of B by a bolt passing through a loop extending upward from the top of the spout C; all substantially as shown and described.

In witness whereof I have hereunto signed my name in the presence of two subscribing witnesses.

HERBERT G. WALTON.

Witnesses:
FRANK ALLEN,
W. D. YATES.